US007986617B2

(12) United States Patent
Knepley, Jr. et al.

(10) Patent No.: US 7,986,617 B2
(45) Date of Patent: Jul. 26, 2011

(54) SYSTEM AND METHOD FOR PROVIDING NETWORK RESILIENCY

(75) Inventors: Joseph Edward Knepley, Jr., Falls Church, VA (US); David Anthony Garbin, Reston, VA (US)

(73) Assignee: Noblis, Inc., Falls Church, VA (US)

( * ) Notice: Subject to any disclaimer, the term of this patent is extended or adjusted under 35 U.S.C. 154(b) by 152 days.

(21) Appl. No.: 12/547,580

(22) Filed: Aug. 26, 2009

(65) Prior Publication Data

US 2011/0051594 A1    Mar. 3, 2011

(51) Int. Cl.
*G06F 11/00* (2006.01)
(52) U.S. Cl. ........................... 370/216; 370/401
(58) Field of Classification Search ............... 370/216, 370/401, 351, 228; 709/238
See application file for complete search history.

(56) References Cited

U.S. PATENT DOCUMENTS

| | | | | |
|---|---|---|---|---|
| 5,838,660 | A * | 11/1998 | Croslin | 370/216 |
| 7,099,286 | B1 | 8/2006 | Swallow | |
| 7,428,213 | B2 | 9/2008 | Vasseur et al. | |
| 7,500,013 | B2 * | 3/2009 | Dziong et al. | 709/238 |
| 2003/0063613 | A1 * | 4/2003 | Carpini et al. | 370/401 |
| 2005/0226212 | A1 * | 10/2005 | Dziong et al. | 370/351 |
| 2006/0002291 | A1 | 1/2006 | Alicherry et al. | |
| 2007/0242608 | A1 | 10/2007 | Ou et al. | |
| 2008/0019266 | A1 * | 1/2008 | Liu et al. | 370/228 |

OTHER PUBLICATIONS

Annexstein et al., "Directional Routing Via Generalized *st*-Numberings," *SIAM J. Discrete Math.*, 2000, pp. 268-279, vol. 13, No. 2.
Cha et al., "Path Protection Routing with SRLG Constraints to Support IPTV in WDM Mesh Networks," Proceedings of the IEEE Global Internet Symposium, Apr. 2006, Barcelona, Spain (5 pages).
Guo et al., "Link-Disjoint Paths for Reliable QoS Routing," *International Journal of Communication Systems*, 2003, pp. 779-798, vol. 16.
Louca et al., "On Network Survivability Algorithms Based on Trellis Graph Transformations," Jul. 1999 (9 pages).
Medhi, "Diverse Routing for Survivability in a Fiber-Based Sparse Network," Proceedings of the IEEE International Conference on Communications, 1991, pp. 672-676, Denver, CO.
Ombuki et al., "Evolutionary Computation for Topological Optimization of 3-Connected Computer Networks," IEEE Proceedings of Systems, Man, and Cybernetics, 1999, pp. I-659 to I-664.
Papadimitratos et al., "Path Set Selection in Mobile Ad Hoc Networks," *Proceedings of the 3rd ACM International Symposium on Mobile Ad Hoc Networking & Computing*, 2002, pp. 1-11.
Pieda et al., "Using OPNET to Evaluate Diverse Routing Algorithms," 1999, pp. 1-5, Tropic Networks.

(Continued)

*Primary Examiner* — Thong Vu
(74) *Attorney, Agent, or Firm* — Finnegan, Henderson, Farabow, Garrett & Dunner, L.L.P.

(57) ABSTRACT

The invention is directed toward an automated system and process to provide resiliency to a network infrastructure where traditional established methods tend to fail. The system analyzes the underlying physical characteristics of the network topology to identify physically diverse backup routing paths among nodes in the network. The system takes as input the number of diverse paths desired and a characteristic(s) used to choose the most desirable paths, such as delay, flow, or cost. The invention searches for multiple solutions for the selected number of diverse paths within the network.

11 Claims, 13 Drawing Sheets

Letters to Cities

OTHER PUBLICATIONS

Inkret et al., "Availability Analysis," *Advanced Infrastructure for Photonic Networks: Extended final report of COST Action 266*, 2003, pp. 155-174, Faculty of Electrical Engineering and Computing, University of Zagreb, Zagreb, Croatia (21 pages).

ITU-T Study Group, "ITU-T recommendation G.662: Generic characteristics of optical amplifier devices and subsystems," ITU-T, Jul. 2005, Geneva, Switzerland (16 pages).

Corning, "Corning and Infinera to Demonstrate Long-Haul Network Design Simplification at OFC/NFOEC 2008," Feb. 21, 2008, http://www.corning.com/opticalfiber/news_and_events/news_releases/2008/2008022101.aspx (2 pages).

Feuerstein, R, "Interconnecting the Cyberinfrastructure," May 21, 2008, University of Nebraska-Lincoln, http://research.unl.edu/events/cyberinfrastructure2005/ci_ppt/Robert%20Feuersteing.ppt (7 pages).

NRIC VII Focus Group 1C: "Analysis of the Effectiveness of Best Practices Aimed at E9-1-1 and Public Safety Final Report," Dec. 2005, Washington, DC (75 pages).

Mello et al., "Availability Maps for Connections in WDM Optical Networks," Oct. 2005, *Fifth International Workshop on Design of Reliable Communication Networks*, Island of Ischia (Naples), Italy (8 pages).

Alcatel-Lucent, "Technology White Paper—Network Availability in Meshed Transport Networks," 2007, Paris, France (16 pages).

\* cited by examiner

A = Seattle
B = San Francisco
C = Los Angeles
D = Salt Lake City
E = Denver
F = Albuquerque
G = Minneapolis
H = Kansas City
I = Oklahoma City
J = Dallas/Ft. Worth
K = Houston
L = Chicago
M = Indianapolis
N = Memphis
O = Cleveland
P = Atlanta
Q = Boston
R = Atlantic City
S = Washington DC
T = Jacksonville
U = Miami Letters to Cities

SYSTEM AND METHOD FOR PROVIDING NETWORK RESILIENCY

FIELD OF THE INVENTION

The disclosed subject matter relates to the field of networking, and more particularly to methods and systems for providing resiliency in a network based on selected paths between nodes in the network.

BACKGROUND OF THE INVENTION

A network is a group of objects, or nodes, connected to each other by links. Data, people, or supplies may be transported between the nodes in a network via the links. Examples of common networks include train stations connected by tracks, a community connected by roads, a communications network connected by wires, fiber optics or satellite links, a supply network connected by delivery routes, and logic gates connected by paths in an integrated circuit. In some networks, such as a ring network, there is only one path between nodes. In others, such as a mesh network, there may be several different paths between any two nodes in the network.

Many networks provide critical functions to business and governments. Should there be an interruption in a supply network, a business may fail to meet its contract obligations. A failure in a communications network may mean critical messages, such as those needed for directing air traffic, are lost. In these types of networks, it is desirable to have a mesh network with backup paths to connect nodes should a primary path fail. This is known as network resiliency. Resiliency ensures that communication between nodes is not interrupted by the failure of any one link between nodes. In some networks, uninterrupted communication is so important that more than one backup path is often desired to increase network resiliency.

Alternate routes, or backup paths, may be identified using methods such as the "shortest path" method, which calculates a diverse path between nodes in a network by minimizing the number of links first and total link distance between nodes second. However, traditional methods are not reliable when more than one backup path is desired. For example, in a network where desired network resiliency requires three diverse paths among nodes, traditional methods fail to calculate the desired number of paths up to 5% of the time. In many networks the failure to provide at least three diverse paths results in an unacceptable failure rate. Therefore there exists a need for a system that will identify multiple alternate paths for all node pairs in a network where traditional methods fail.

SUMMARY OF THE INVENTION

Embodiments consistent with the invention provide methods and systems for providing resiliency in a network. Resiliency is provided by locating multiple diverse paths in a selected direction between a source node and a destination node. This is accomplished by forcing an initial path from the source node to the destination node in the selected direction, for example the northernmost path. Additional diverse paths are found by removing the links used in previously found paths, and forcing the path once again in the selected direction. When a path from the source node to the destination node cannot be found without using a link used by a previously found path, all paths in the selected direction have been found, and comprise the diverse paths between the source node and the destination node in the selected direction. Diverse paths may be found in this way for each desired direction. This forced directionalized routing allows embodiments of the invention to provide more diverse paths between a source node and a destination node than traditional path location tools.

In addition, embodiments consistent with the invention may also use path criteria, such as a minimum number of paths or path optimization criteria, for determining the direction with the most desirable set of paths between the source node and the destination node. For example, at least three diverse paths may be desired, and the direction that contains the fastest route may be more desirable than the other directions. The path criteria may help select the direction with the optimal set of diverse paths between the source node and destination node in the network.

Embodiments consistent with the invention may also recommend a change to the network topology to accommodate additional diverse paths. If a desired number of diverse paths between a source node and a destination node cannot be located, the invention may suggest the addition of links and/or nodes to create the desired number of diverse paths.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

DESCRIPTION OF THE EMBODIMENTS

Reference will now be made in detail to exemplary embodiments of the invention, examples of which are illustrated in the accompanying drawings. Wherever possible, the same reference numbers will be used throughout the drawings to refer to the same or like parts.

Figure 1:
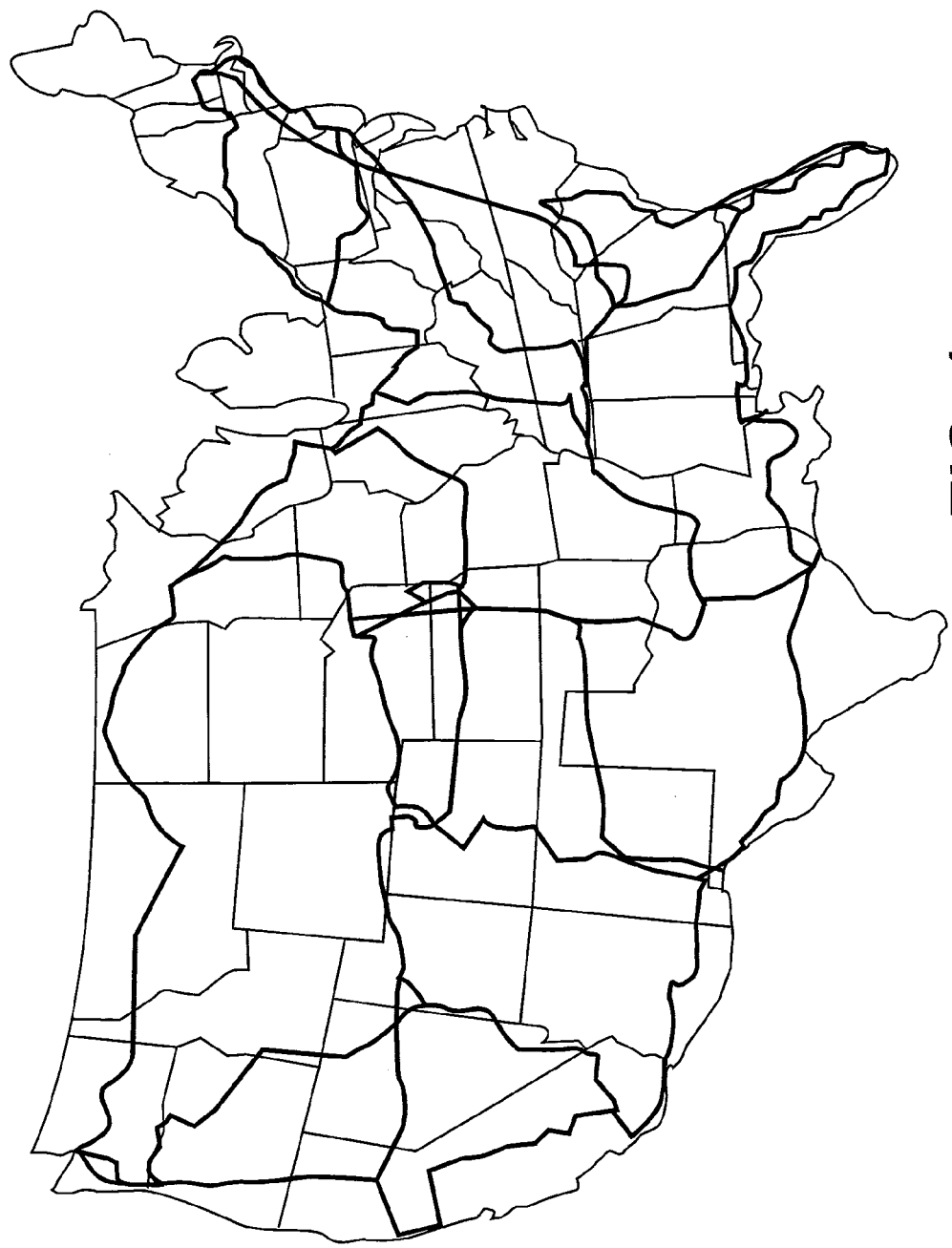
FIG. 1 is an exemplary network topology, consistent with embodiments of the present invention.

FIG. 1 is an exemplary network topology, consistent with embodiments of the present invention. The nodes of this network may represent, for example, cities or transfer stations. The links of the network may represent supply lines, train tracks, or fiber optic or other communication lines. This is an example of a mesh network.

Figure 2:
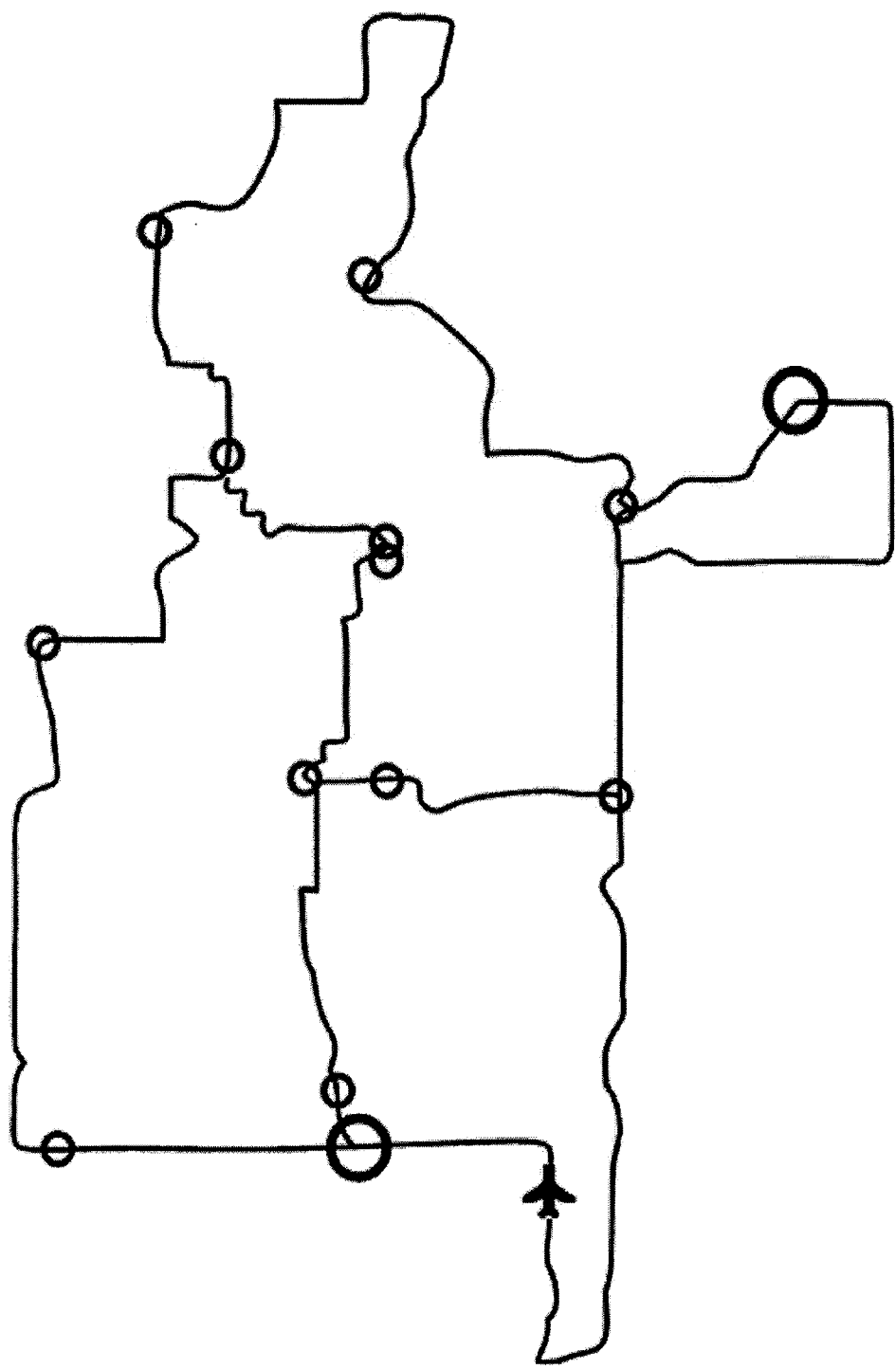
FIG. 2 is another an exemplary network topology, consistent with embodiments of the present invention.

FIG. 2 is another exemplary network topology, consistent with embodiments of the present invention. The nodes of this network may represent, for example, add/drop multiplexers in a power network.

Many networks, such as those shown in FIGS. 1 and 2, provide critical functions to business, cities, and governments. Network failures may cause great financial hardship, great inconvenience, or even threaten physical harm. Therefore, these networks require resiliency in the form of backup paths between nodes, so that if a primary path between nodes fails, the flow of data, things, or people remains un-interrupted. In some cases, the risk that a backup path may fail must also be accounted for. Traditional methods for identifying multiple paths between nodes in a network tend to fail when three or more paths are required between the nodes. Because of this, there exists a need for a network routing system that can determine multiple physically diverse backup paths.

It is also highly desirable that a system for finding physically diverse paths be flexible and configurable. Some networks rely on speed, others value reliability, while still others favor low cost. It is desirable to take these variables into consideration when calculating backup paths and determining which backup paths to select. The burden of calculating backup paths, and the failure rate of traditional methods, increases when a network requires the backup paths to have node diversity in addition to link diversity, or when a network requires three, four, or more diverse paths.

Additionally, when the desired number of paths cannot be found with the existing network topology, there exists a need for a network routing system to determine where additional nodes or links may be placed within the network topology to yield at least one potential solution. For example, some networks require a primary path and two diverse backup paths, and when the current network topology will not support this number of backup paths there exists a need to determine where additional links or nodes can be placed in the network topology so that all source to destination nodes can have three diverse paths.

A network routing system with directionalized routing in accordance with the invention addresses these needs. The system is flexible and configurable, having the capability for users to select n disjoint routes having node or link diversity. It also has the capability to allow the user to select performance criteria to be applied to the paths to determine which is the best choice for a primary path.

Systems consistent with the present invention analyze the underlying physical characteristics of network topology to identify physically diverse backup routing paths among nodes in the network. An exemplary system may identify paths by looping through all compass directions to determine all possible solutions for the specified number of diverse paths. If more than a single solution for the desired number of paths is found, the solutions may be ranked by optimization variable(s) to determine the path(s) chosen. Such an exemplary system enables any given number of backup paths to be found for each source to destination node pair in a network.

Figure 3:
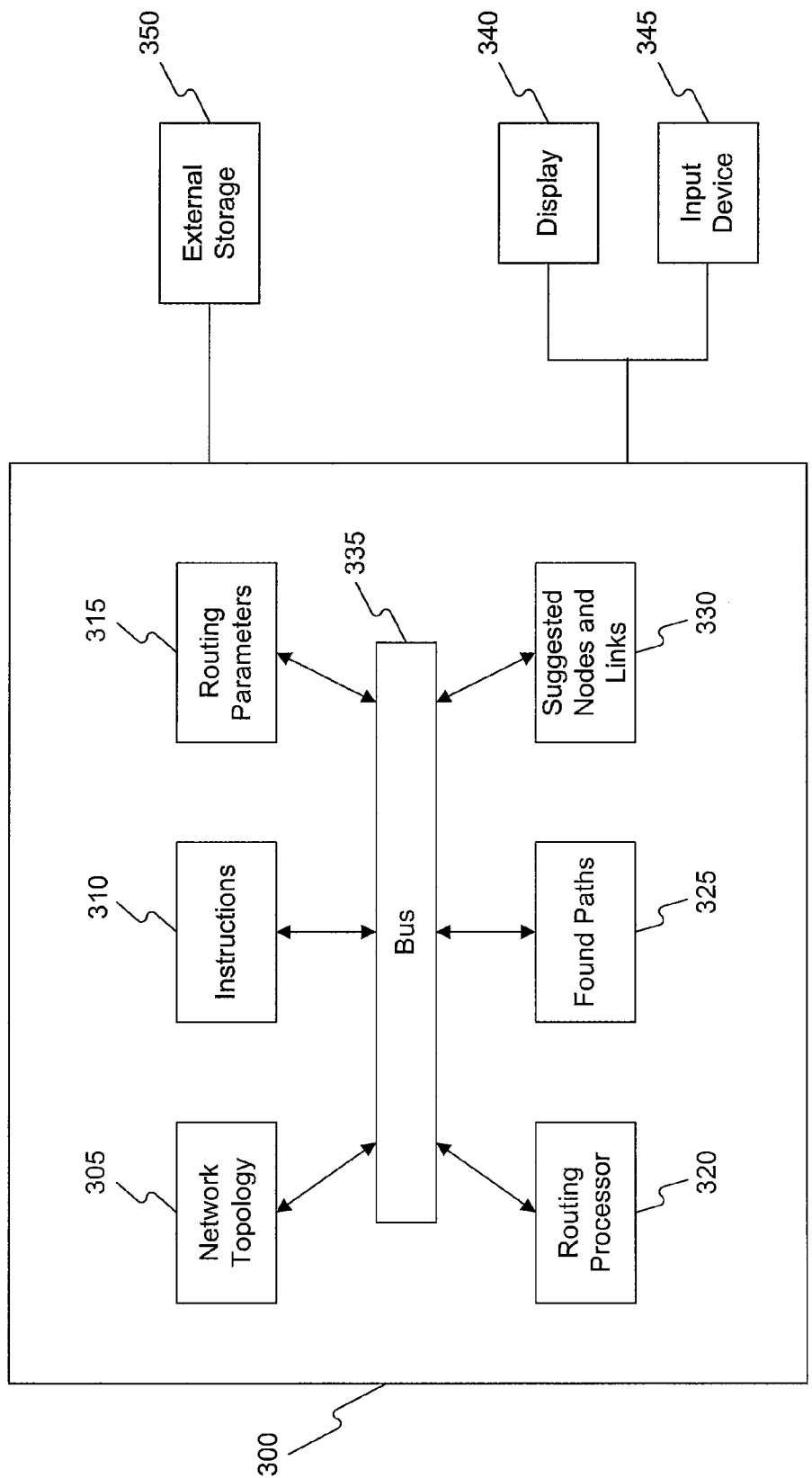
FIG. 3 is a diagram of a system, consistent with embodiments of the present invention.

FIG. 3 is a diagram of a routing system, consistent with the embodiments of the present invention. System 300 contains data representing a network topology 305, which is stored in a memory storage device. Network topology 305 may be received, for example, through an input device 345 or from an external storage device 350. Network topology 305 may be data describing links and nodes that make up a network. For example, nodes may be identified by longitude and latitude, associated devices, street intersections, or IP address. Links may be described using the nodes they connect to, bandwidth, or track name.

System 300 also contains instructions 310, bus 335, and routing processor 320. Instructions 310 may be stored in main memory and received from either an external or internal computer readable medium. Instructions 310 may be sent to routing processor 320 via bus 335. Routing processor 320 may execute instructions 310, using network topology 305 and/or routing parameters 315. Routing parameters 315 may be obtained through input device 345, or external storage 350. Routing parameters 315 may be, for example, path endpoints, the number of diverse paths desired between nodes in the network, path diversity selection, and/or path performance parameters. The path endpoints may represent the starting node and the ending node in the network topology. A path diversity selection may be either link diverse or link-and-node diverse. Link diverse paths cannot share the same link, but may share the same nodes. Link-and-node diverse paths cannot share the same links nor the same nodes.

Path performance parameters indicate what criteria to use to rank one path above another path in the network. Minimizing delay is one example of a path performance parameter. Under this criteria a path representing a faster travel time between the path endpoints would rank higher than a path with a slower travel time between the same two endpoints. Another example of a path performance parameter is availability. Under this criteria a path with fewer interruptions in service over time would rank higher than a path with more interruptions in service. For example, in a network of train stations and train tracks, track lines requiring frequent repairs in the past would have a lower availability ranking than track lines having a scant repair history. Weather delays on a track line could also affect a line's availability ranking. Another example of a path performance parameter is cost. Under this criteria paths having a lower transportation cost would rank higher than paths with higher transportation costs. An exemplary system consistent with the present invention is not limited to the three examples above and may have other path performance parameters.

Routing processor 320 may determine primary and/or alternate paths between nodes in the network using instructions 310. The primary and/or alternate paths 325, may be stored on a computer readable medium, and/or presented to a user via display 340, etc. The display may be, for example, a computer monitor connected to system 300 or a printed report. In certain embodiments, if routing processor 320 cannot calculate the desired number of paths requested by routing parameters 315, routing processor 320 may suggest additional nodes or links 330 be added to network topology.

Figure 4:
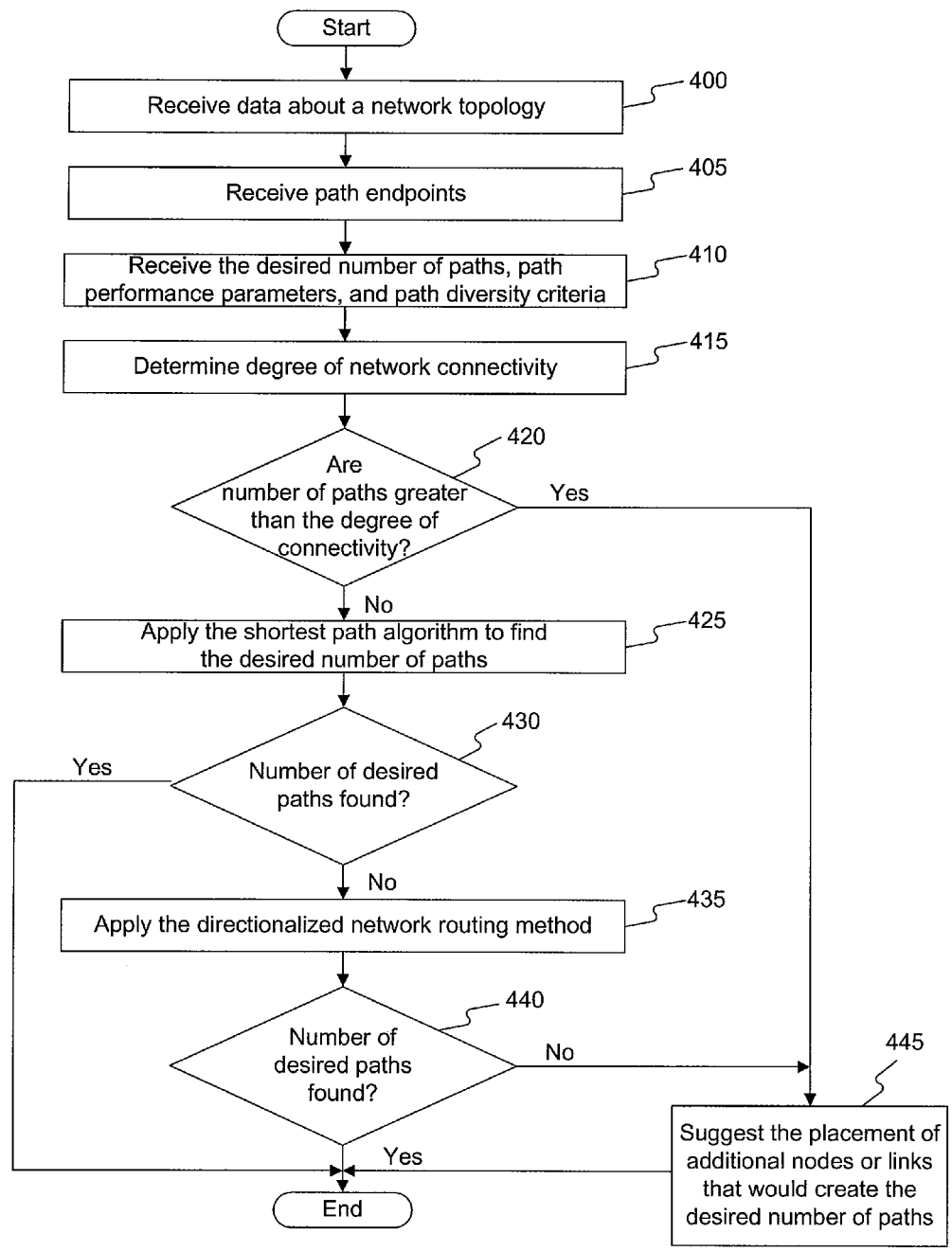
FIG. 4 is a flow diagram illustrating an exemplary network routing process consistent with embodiments of the present invention.

FIG. 4 is a flow diagram illustrating an exemplary network routing process consistent with embodiments of the present invention. In certain embodiments, this process may be implemented according to instructions 310. In an embodiment implemented using system 300, as shown in FIG. 4, routing processor 320 receives data describing a network topology (step 400) for a network such as the one shown in FIG. 6a. It stores the network topology 305 in a memory storage device. Next, system 300 receives routing parameters 315, including data representing the path endpoints (step 405), and data describing the desired path characteristics (step 410), such as the number of paths desired, the path diversity criteria, and the path performance parameters as described above. Routing parameters 315 may be stored in a memory storage device, such as 350, by routing processor 320.

After routing processor 320 receives the desired number of paths, it determines the degree of network connectivity in step 415 and compares the connectivity to the desired number of paths in step 420. If the desired number of paths exceeds the network connectivity (step 420, Yes) then routing processor 320 warns the user, for example, through display 340 that the current network topology will not support the requested number of source-to-destination diverse paths, and may recommend new link(s) and/or node(s) in step 445. If the network connectivity supports the desired number of paths, (step 420, No), routing processor 320 may use traditional methods, such as the shortest path, to find the desired number of paths, as shown in step 425. If this step fails to find the desired number of paths (step 430, No), routing processor 320 will execute instructions 310 for the directionalized network routing method (step 435). If the desired number of paths are still not found (step 440, No), routing processor 310 will recommend new links and/or nodes.

Figure 5:
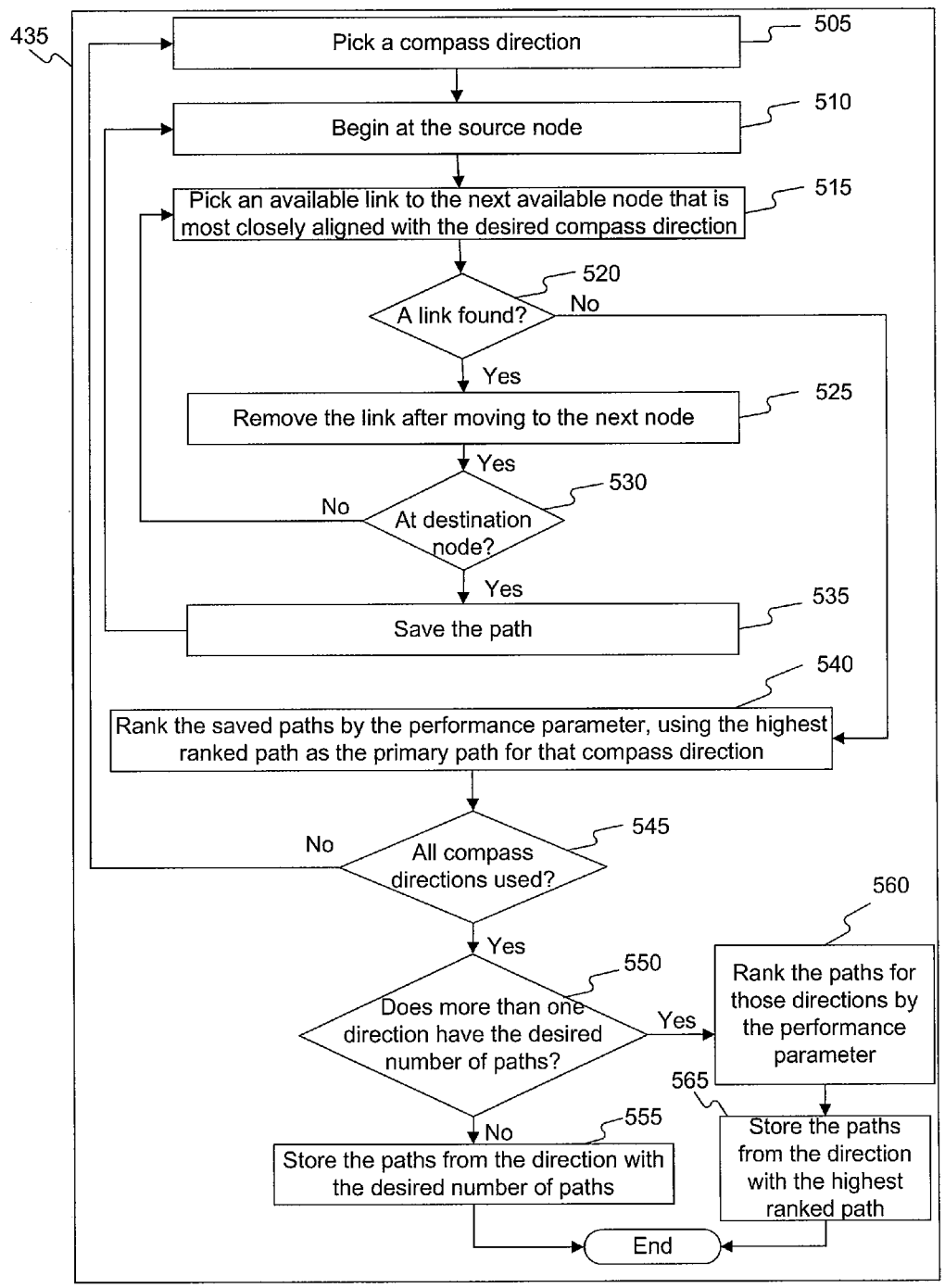
FIG. 5 is a flow diagram of an exemplary directionalized routing process, consistent with embodiments of the present invention.

FIG. 5 is a flow diagram of an exemplary directionalized routing process consistent with embodiments of the present invention. In an embodiment implemented using system 300, to begin, routing processor 320 selects a compass direction, for example North, in step 505. Step 510 begins at the source node, e.g. as received in step 405. From this node, routing processor 320 may choose an available link to the next available node that is most closely aligned with the compass direction selected in step 505, as shown in step 515. Distance modifications can be used to find a link most closely aligned with a compass direction. For example, the northern, eastern, southern and western most links may be determined by modifying the distance between connected node pairs from the actual distance to a transformation of the distant end node's latitude or longitude, using distance modifications such as those described below:

Northernmost distance from node x1 to node x2 (x2 is not destination node)

$$D(x1,x2)=1.5\char`\^\{[180-\text{latitude}(x2)]/2\}$$

Easternmost distance from node x1 to node x2 (x2 is not destination. Each "If" statement is tested in sequence)

$$AL(x2)=\text{AdjustedLongitude}(x2)=\text{longitude}(x2)-\text{longitude}(x1)$$

If $(AL(x2)<0)$ then $AL(x2)=AL(x2)+360$

If $(AL(x2)\leq 180)$ then $AL(x2)=180-AL(x2)$

If $(AL(x2)>180)$ then $AL(x2)=540-AL(x2)$ $$AL(x2)=AL(x2)+1$$

$$D(x1,x2)=1.5\char`\^[AL(x2)/4]$$

Southernmost distance from node x1 to node x2 (x2 is not destination node)

$$D(x1,x2)=1.5\char`\^[\text{latitude}(x2)]$$

Westernmost distance from node x1 to node x2 (x2 is not destination node. Each "If" statement is tested in sequence)

$$AL(x2)=\text{AdjustedLongitude}(x2)=\text{longitude}(x2)-\text{longitude}(x1)$$

If $(AL(x2)<0)$ then $AL(x2)=AL(x2)+360$

If $(AL(x2)\leq 180)$ then $AL(x2)=180-AL(x2)$

If $(AL(x2)>180)$ then $AL(x2)=540-AL(x2)$

If $(AL(x2)>0)$ then $AL(x2)=360-AL(x2)$ $$AL(x2)=AL(x2)+1$$

$$D(x1,x2)=1.5\char`\^[AL(x2)/4]$$

Any direction distance from node x1 to node x2 (x2 is destination node)

$$D(x1,x2)=1$$

Latitudes are normalized with 0 degrees at the South Pole, 90 degrees at the Equator and 180 degrees at the North Pole. Longitudes are normalized with 0 degrees at the Greenwich Meridian and increase bearing east, reaching 360 degrees upon reaching the Greenwich Meridian again.

After determining the link most closely aligned with the compass direction selected in step 505, routing processor 310 moves to the next node and removes the link from the pool of available links in network topology 305, as shown in step 525. If the destination node received in step 405 is not the current node, (step 530, No), routing processor 310 repeats steps 515 to 530 until the destination node is reached. Upon reaching the destination node, routing processor 310 has found the first path and stores it in memory device 325, as shown by step 535. Routing processor 310 may then repeat steps 510 through 535, but in each subsequent iteration, all the links used in the previously found paths have been removed from the pool of available links.

Once no more available links are available (step 520, No), all possible paths in the selected direction have been found and routing processor 310 continues to step 540. In step 540, routing processor 320 may rank all paths found in the selected compass direction, for example, using the performance parameters received in step 410. In certain embodiments, the path that optimizes the selected performance parameters is the primary path for the selected compass direction, and the other ranked paths are assigned as backup paths. For example, the path with the fastest travel time or greatest bandwidth may be chosen. After determining all possible paths for the selected compass direction, routing processor 320 may select the next compass direction, and make all links in the network available to the pool of available links. Routing processor 320 may then repeat steps 510 through 545 for the new compass direction.

Once routing processor 320 finds the possible paths for each compass direction, in step 550 it determines which compass directions produced at least the desired number of paths. The desired number of paths may be one of routing parameters 315 received in step 410. If more than one compass direction has the desired number of paths (step 550, Yes) routing processor 320 may rank the paths for those directions by the performance parameters, as shown in step 560. If none of the directions have the desired number of paths, routing processor 320 may rank the paths found for each direction in step 560 by the performance parameters. The performance parameter may also be one of the routing parameters 315. Routing processor 320 stores all paths from the compass direction that optimizes the selected performance parameter in primary and alternate paths memory storage device 325, as shown in step 565. If only one compass direction has the desired number of paths, routing processor 320 stores the paths from that direction in the primary and alternate paths memory storage device 325, as shown in step 555. The paths found in the found paths memory storage device 325 are then available for step 430.

Figure 6A:
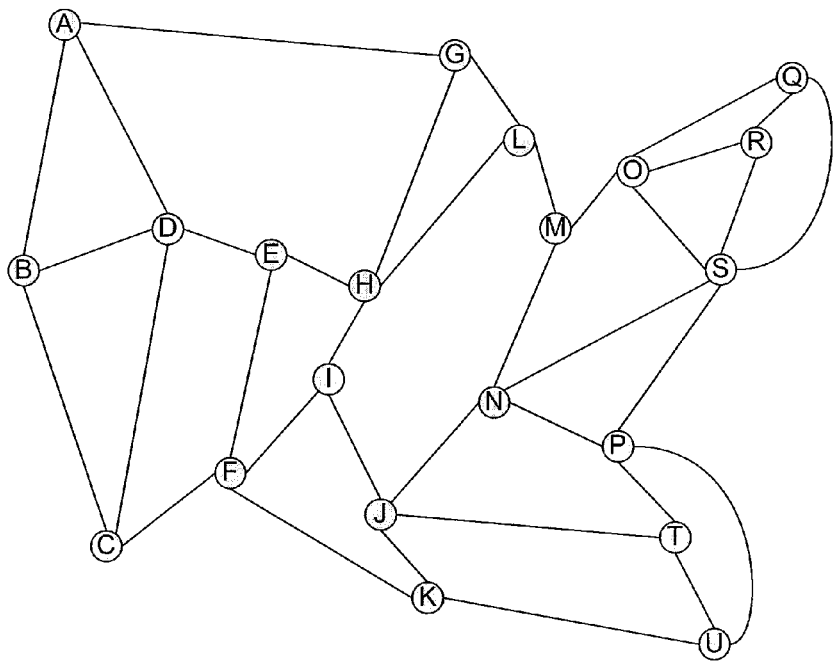
FIGS. 6*a*-6*n* are exemplary network topologies depicting a directionalized routing processes consistent with embodiments of the present invention.
Figure 6B:
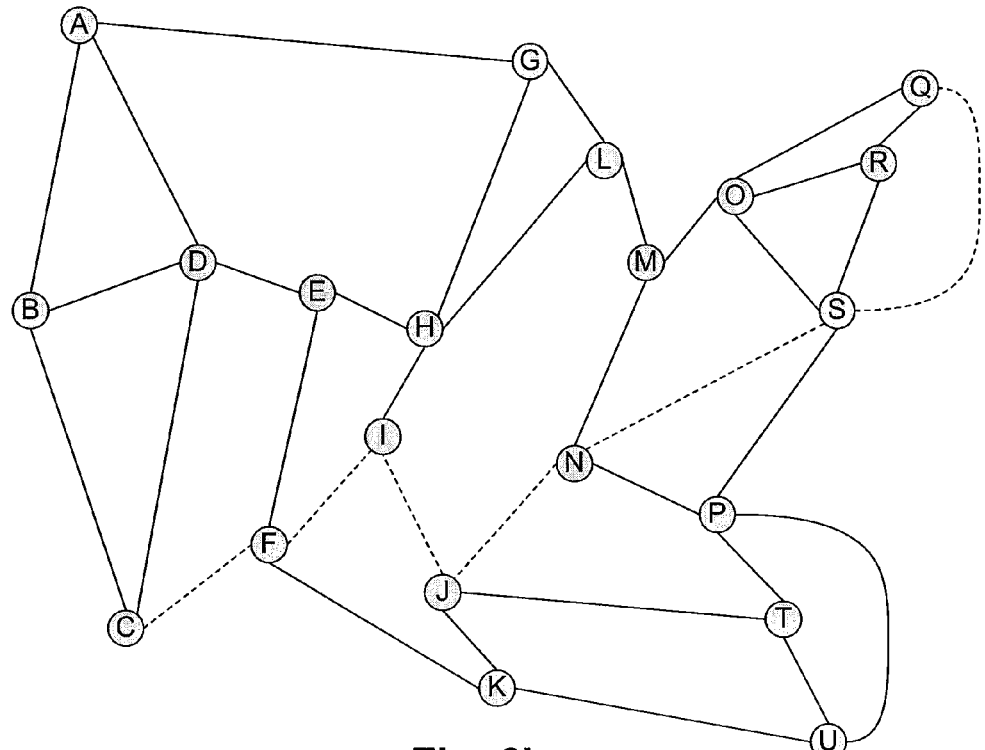
Figure 6C:
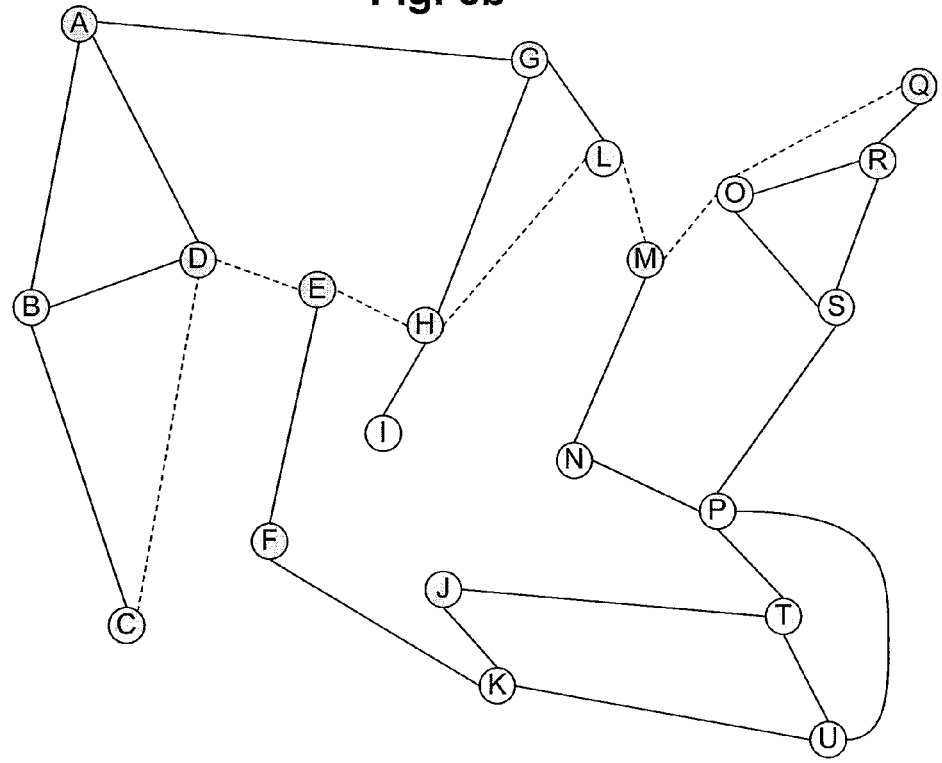
Figure 6D:
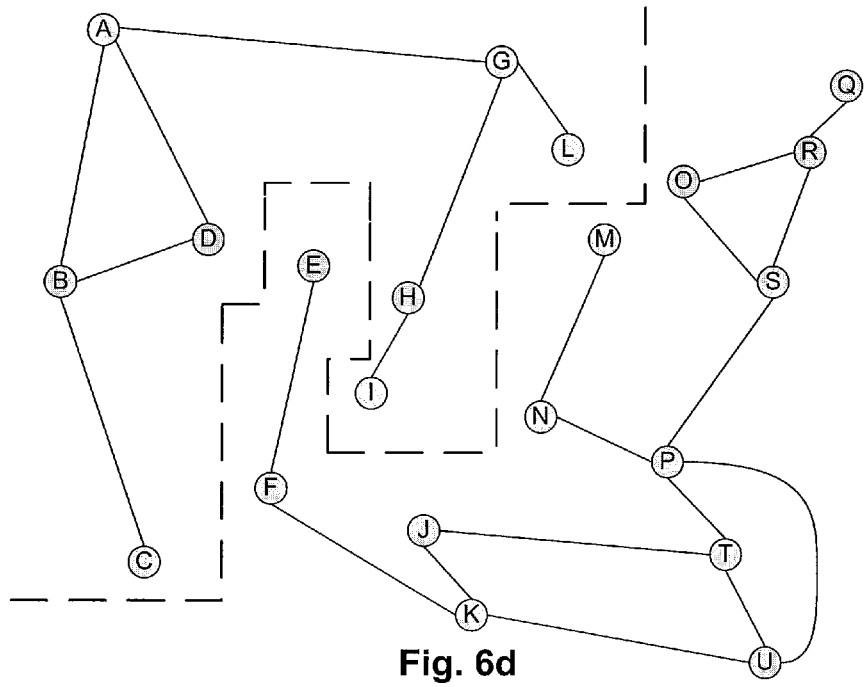
Figure 6E:
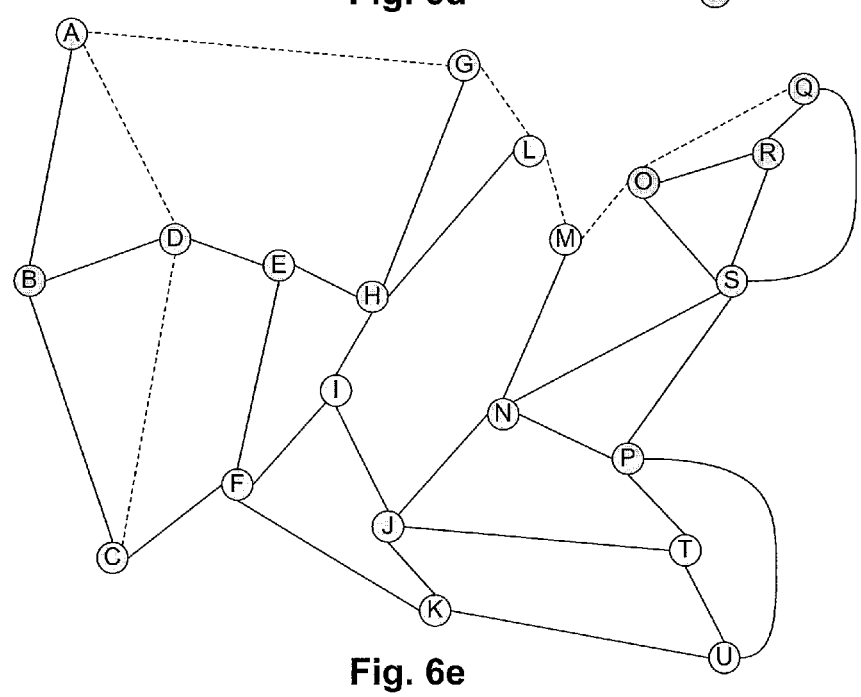
Figure 6F:
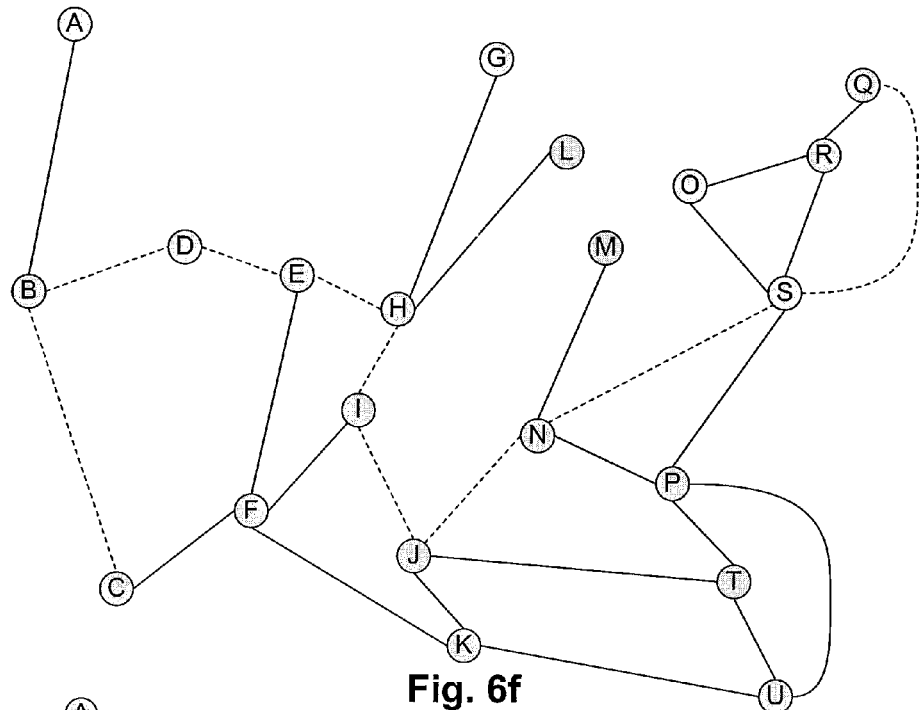
Figure 6G:
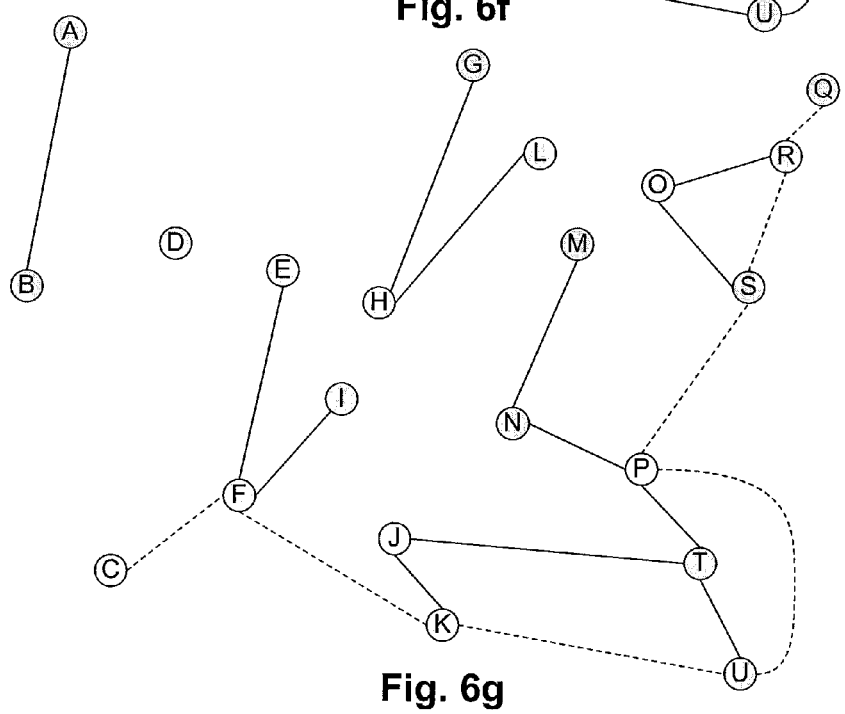
Figure 6H:
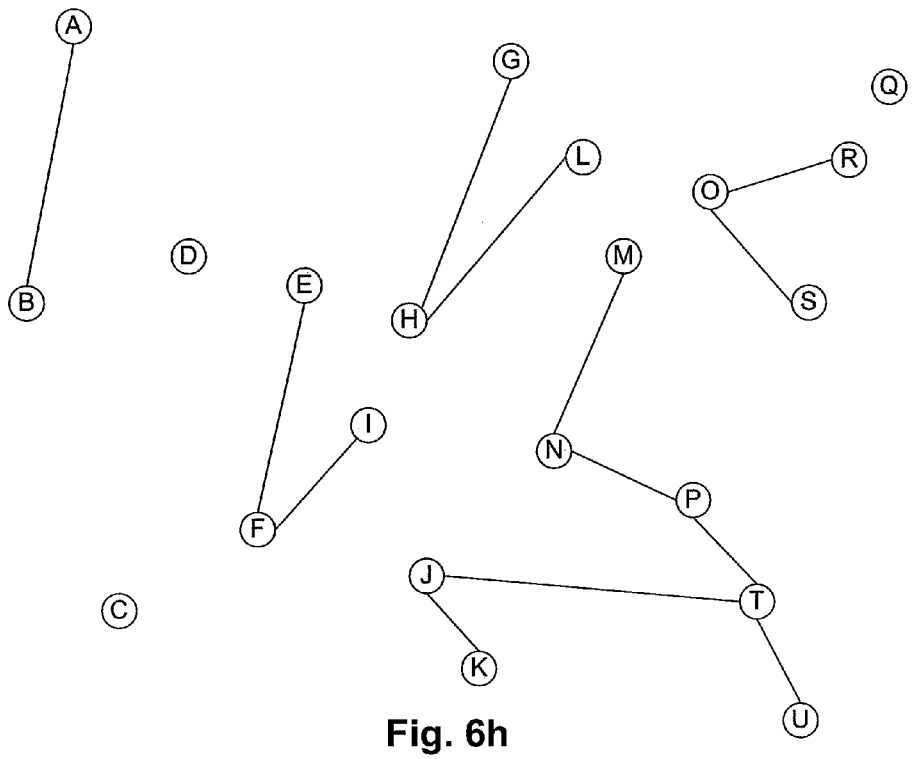
Figure 6I:
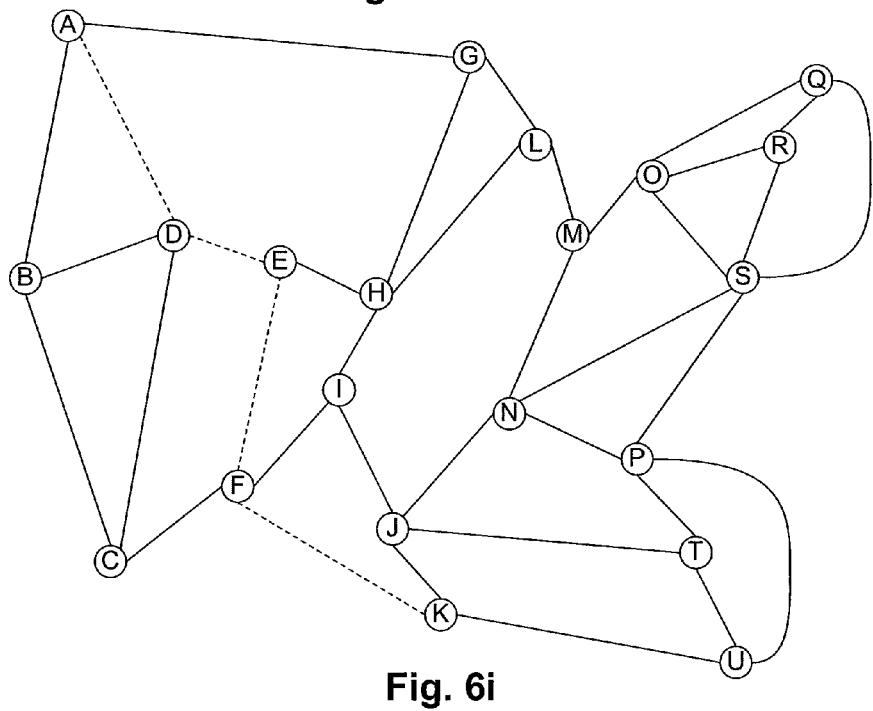
Figure 6J:
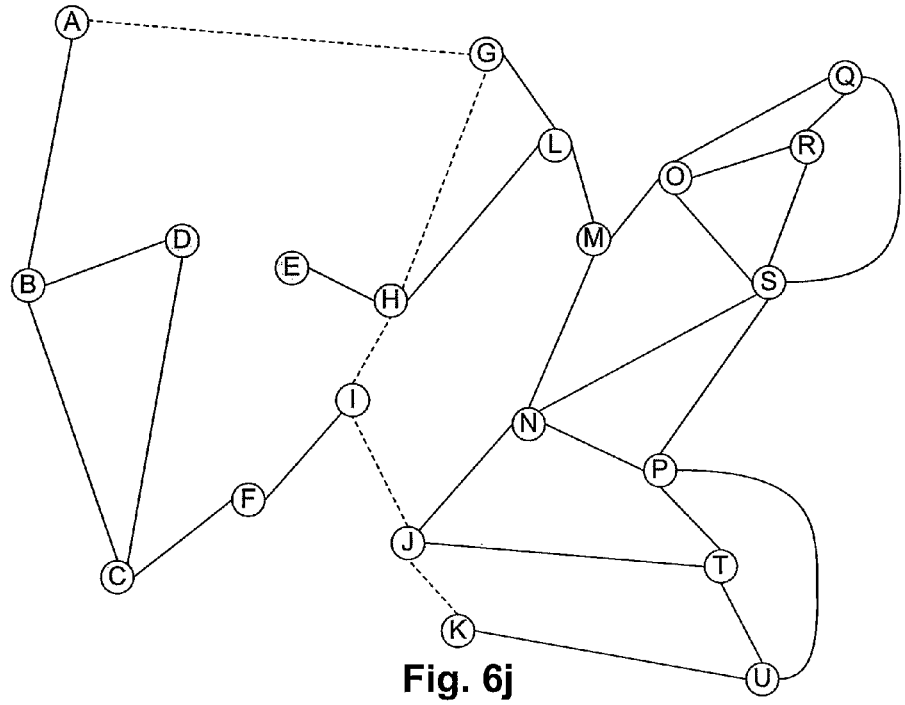
Figure 6K:
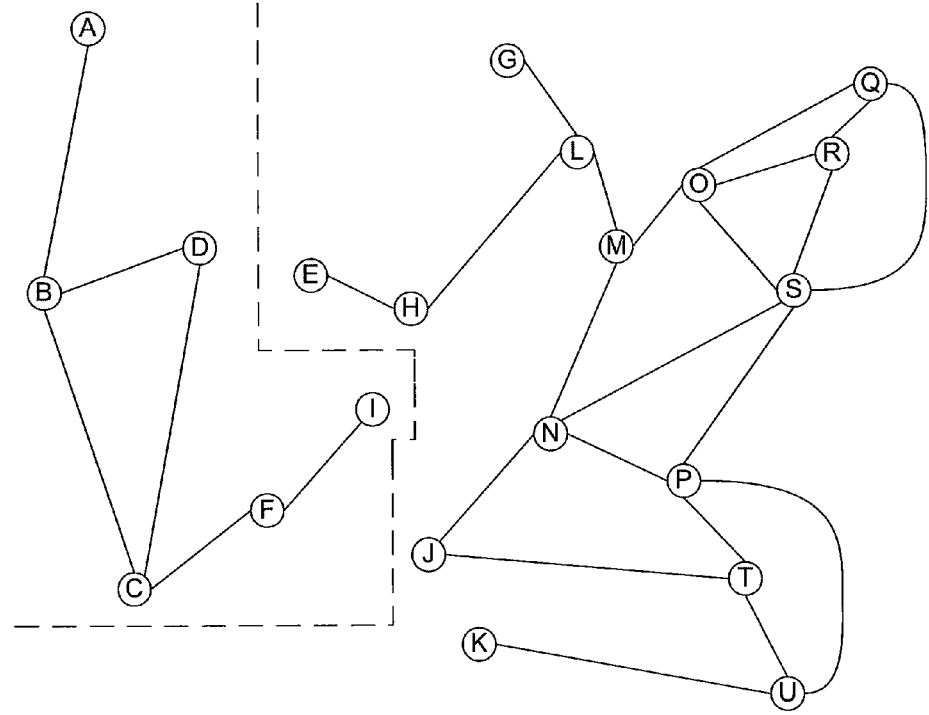
Figure 6L:
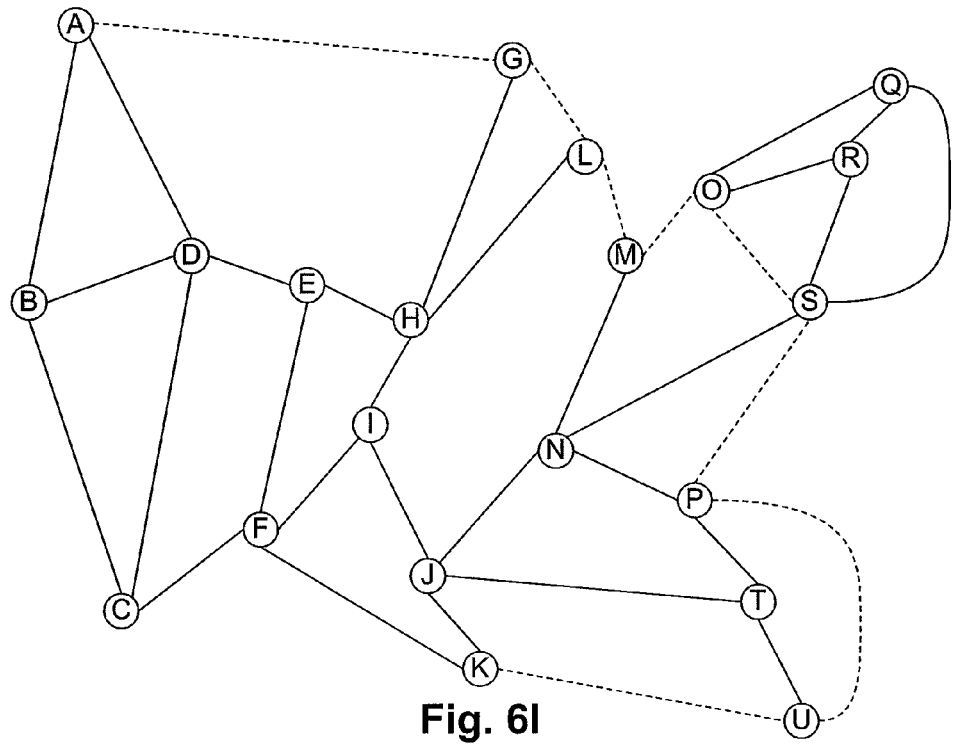
Figure 6M:
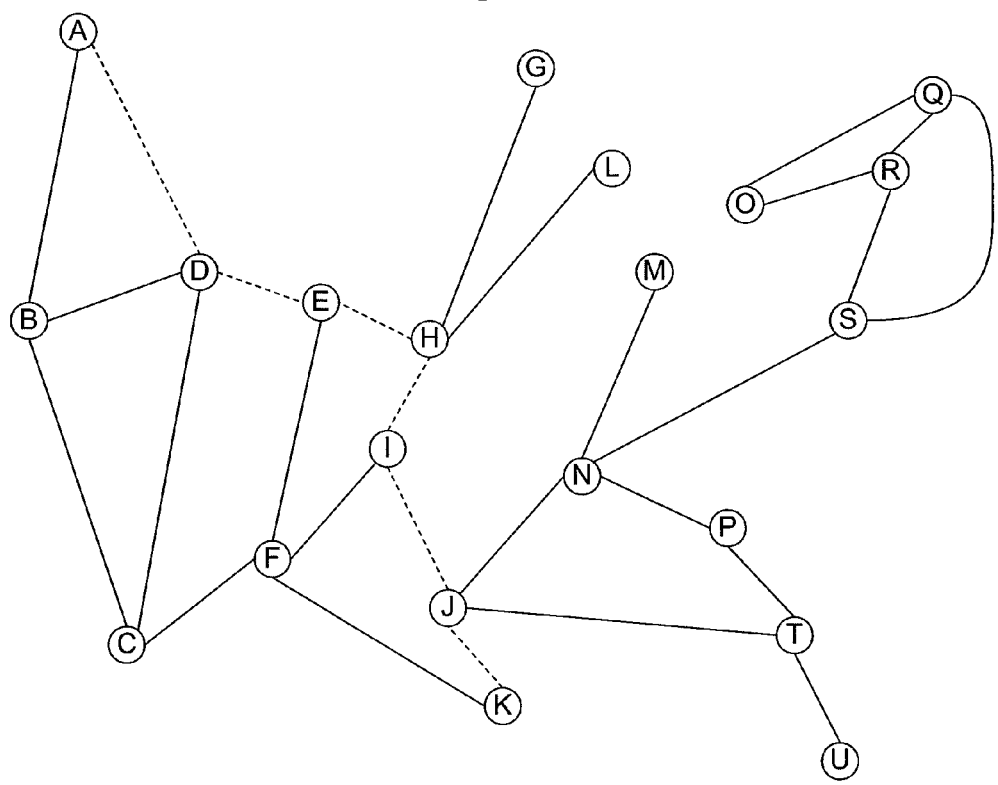
Figure 6N:
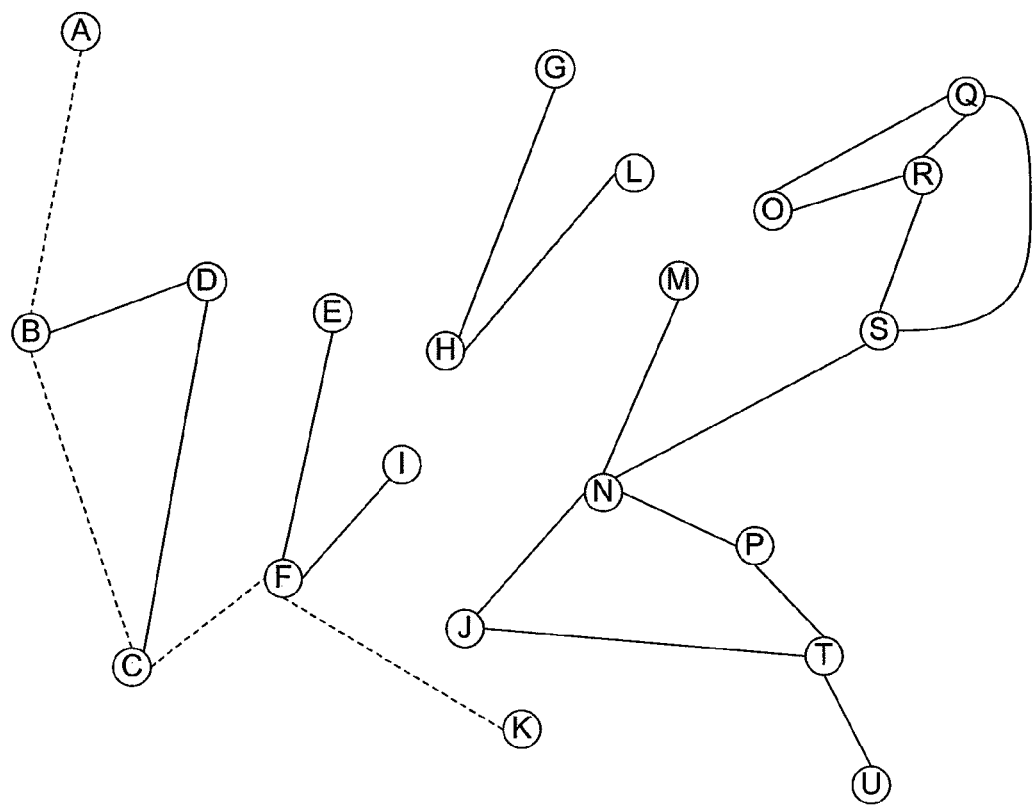

FIGS. 6a-6n are exemplary network topologies depicting directionalized routing processes consistent with the embodiments of the present invention. An example of the operation of the directionalized routing method of the present invention follows, using the network topology shown in FIG. 6a. For the first example assume that three link diverse paths are desired for source node C and destination node Q. Initially, the routing processor attempts to find three link diverse paths using a shortest path algorithm and an iterative process in which the links used in previously discovered paths are removed from the network—this is a standard, well-known process returning only two paths between C and Q. Because it has the smallest number of links, the primary path is C→F→I→J→N→S→Q, as shown in FIG. 6b. The routing processor removes the links used in the primary path from the network and runs the standard shortest path algorithm a second time. This time the routing processor finds the backup path C→D→E→H→L→M→O→Q, as shown in FIG. 6c. Removing the links used in this backup path separates the network, as shown in FIG. 6d, and additional paths from C to Q cannot be calculated by the routing processor. Thus the traditional method has failed to provide the desired number of paths for this source and destination pair.

Compare this to an embodiment consistent with the present invention in which the routing processor uses the directionalized routing method by establishing the northernmost route. Starting at source node C the path is forced in the northernmost direction, as shown in FIG. 6e. Node D is the northernmost node connected to node C, and is selected as the second node in the path. Likewise, node A is the northernmost node connected to node D, and is selected as the second node in the path from C to Q. The routing processor follows this process until an interim or tandem node connected to the destination node Q is reached—in this example, the first tandem node connected to Q is node O. Once a tandem node connected to the destination node is reached, the path is forced to the destination node regardless of whether the destination node is the northernmost node connected to the last tandem node in the source-to-destination path. In this example, Q happens to be the northernmost node connected to O. Therefore, C→D→A→G→L→M→O→Q is the northernmost path from C to Q calculated by the routing processor using the directionalized routing method, as shown in FIG. 6e.

After establishing the northernmost path as the primary path from C to Q, the routing processor removes the links used in the northernmost path and calculates the next northernmost path, if possible. The next northernmost path in this example is C→B→D→E→H→I→J→N→S→Q, as shown in FIG. 6f. After removing links used in both the first and second northernmost paths, the routing processor can calculate a third path, C→F→K→U→P→S→R→Q, as shown in FIG. 6g. After removing the links used in the three northernmost paths from C to Q, C and Q are both separated from all other nodes, as shown in FIG. 6h. Therefore, no additional paths from C to Q can be calculated and the routing processor is finished with the northernmost path calculation. The routing processor then ranks paths found by forcing routes to the north using a selected performance parameter, such as delay, availability, or cost. The path optimizing the selected performance parameter becomes the primary northernmost path. The remaining paths are the northernmost backup paths. Thus, for example, the primary path provides the best performance, and the first backup path provides the second best performance, and so on.

Once the northernmost paths are found, the routing processor investigates the easternmost, southernmost and westernmost directions using the method described above. Once the paths for all directions have been found, if more than one direction returns three link diverse paths, the direction that optimizes the selected performance parameter (e.g., minimize delay, maximize availability, etc) is chosen by the routing processor.

It should be noted that the routing processor uses path efficiency when calculating the directional paths. This can be seen in another example using the network topology of 6i. In this example three link diverse paths are desired from source node K to destination node A. Once again the standard, iterative shortest path algorithm returns only two paths between K and A. The primary path of K→F→E→D→A, as shown in FIG. 6i, and the backup path of K→J→I→H→G→A, as shown in FIG. 6j. Removing the links used in both the primary and backup paths, as shown in FIG. 6k, separates the network and the routing processor cannot calculate additional paths from K to A.

This may be compared to an embodiment consistent with the invention where the routing processor applies the directionalized routing method to discover the route between K and A. Forcing routes to the north, the routing processor returns only two paths between K and A. In fact, forcing routes to the north returns the same two paths returned by the standard shortest path algorithm described above. Next, the routing processor forces routes to the east. The easternmost path of K→U→P→S→→O→M→L→G→A is shown in FIG. 6l. Note in FIG. 6l, the true easternmost paths U→T→P and S→Q→R→O are replaced by U→P and S→O, respectively, by the directionalized routing algorithm to improve the path's efficiency.

The routing processor removes the links used in the easternmost path from the pool of available links and calculates the next easternmost path K→J→I→H→E→D→A, as shown in FIG. 6m. Note that the true easternmost route of E→F→C→D is replaced by the more efficient route E→D. After removing links used in the easternmost paths already found, the routing processor can calculate a third path, K→F→C→B→A, as shown in FIG. 6n. Thus the routing processor calculates three diverse paths between source node K and destination node A using the forced directionalized routing method. These paths may be ranked using the performance criteria to determine the primary and backup paths.

FIG. 6g also demonstrates an example of path optimization. In this figure, the northernmost route of K→J→T→P is replaced by the more efficient route K→U→P.

One of ordinary skill in the art would recognize that the invention is not limited to the four primary compass points. Although the four compass points will be sufficient for most networks, all compass directions may be utilized in the present invention for networks with high connectivity.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for providing resiliency in a network comprising:
   identifying a network topology including a plurality of nodes and links, each link connecting two nodes;
   receiving criteria for preferred routes through the network between a source node and a destination node, the criteria including a number of diverse paths connecting the source node and the destination node, a path diversity criteria, and an optimization parameter for use in ranking paths, wherein the path diversity criteria is link-and-node diversity, such that each located path cannot share any node or link;
   finding paths through the network using a compass direction by:
   locating a path in the network from the source node to the destination node by:
   beginning at the source node, following a link most closely aligned with the selected compass direction from the source node to a next node;
   extending the path from the next node by following a link most closely aligned with the selected compass direction to another node, and repeating the extending step until the path reaches the destination node;

repeating the locating step, while omitting links and nodes that are part of a previously located path, to determine additional diverse paths from the source node to the destination node; and applying the optimization parameter to rank the located paths to identify a primary path and one or more backup paths for the selected compass direction;

repeating the finding step for each compass direction;

for each compass direction that found the number of diverse paths specified by the route criteria, applying the optimization parameter to rank the primary paths to determine one or more optimal paths from the source node to the destination node; and outputting the one or more optimal paths as the preferred routes.

2. The method of claim 1, wherein the optimization criteria is at least one of distance, cost, availability, bandwidth, throughput, capacity, delay, and speed.

3. The method of claim 1, wherein the compass directions are north, south, east, and west.

4. A method for providing resiliency in a network comprising:

identifying a network topology including a plurality of nodes and links, each link connecting two nodes;

receiving criteria for preferred routes through the network between a source node and a destination node wherein the criteria includes link-and-node diversity, such that each located path cannot share any node or link;

finding paths in a selected compass direction by:

locating a path in the network from the source node to the destination node by forcing the path in the selected compass direction;

repeating the locating step as long as it is possible to determine additional diverse paths from the source node to the destination node while omitting any link and any node that is part of a previously located path, and ranking the located paths according to the criteria to identify a primary path and one or more backup paths in the selected compass direction; repeating the finding step for each compass direction;

ranking the primary path of each compass direction to determine the optimal compass direction; and selecting the paths corresponding to the optimal compass direction as the preferred routes through the network.

5. The method of claim 4, wherein the criteria further includes at least one of availability, cost, distance, speed, throughput, bandwidth, capacity, and delay.

6. The method of claim 4, wherein the criteria further includes a number of diverse paths connecting the source node and the destination node.

7. A computer system for providing resiliency in a network comprising:

an input device for receiving a network topology including a plurality of nodes and links, each link connecting two nodes, and for receiving criteria for finding routes through the network between a source node and a destination node, wherein the route criteria includes link-and-node diversity, such that each located path cannot share any node or link;

a network path processor for finding paths in a direction by:

locating a path in the network from the source node to the destination node by forcing the path in the selected direction, and repeating the locating step while it is possible to determine additional diverse paths from the source node to the destination node, without using any link or any node that is part of a previously located path;

the network path processor repeating the finding step for a least one other direction; and an output device for outputting the paths associated with each direction as the found routes.

8. The system of claim 7, wherein the route criteria further includes at least one of availability, cost, distance, speed, throughput, bandwidth, capacity, and delay.

9. The system of claim 7, wherein the network path processor further applies the route criteria to rank the paths associated with each direction.

10. The system of claim 7, wherein the route criteria further includes a number of diverse paths connecting the source node and the destination node.

11. The system of claim 7, wherein the finding further comprises:

ranking the located paths using the route criteria to identify a primary path and one or more backup paths for the selected direction.

* * * * *